Feb. 28, 1956  O. R. SCHOENROCK  2,736,624
OIL SEAL
Filed Feb. 28, 1952
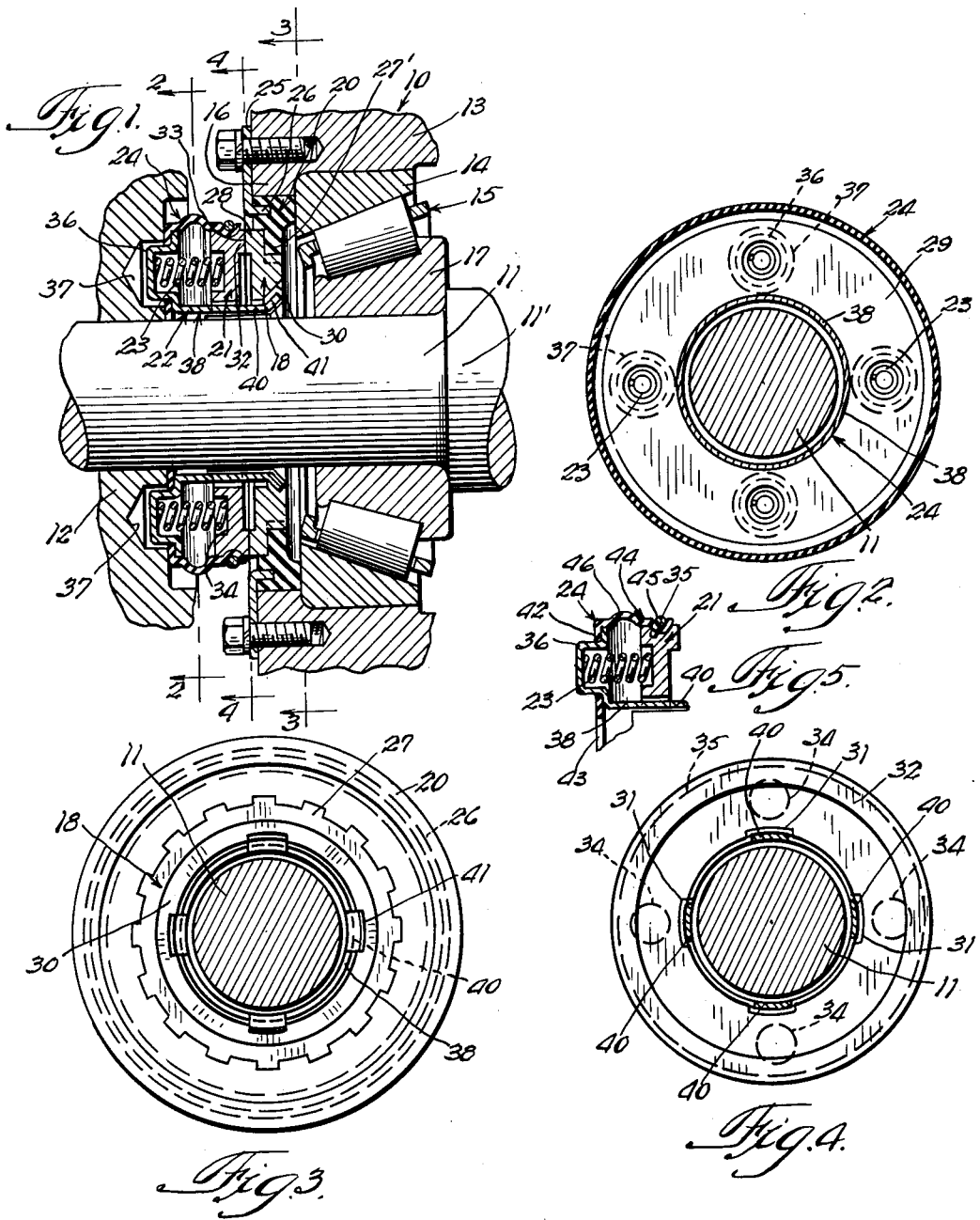
INVENTOR.
Otto R. Schoenrock.
BY
Thiess, Olsen & Mecklenburger
Attys

United States Patent Office 2,736,624
Patented Feb. 28, 1956

2,736,624
OIL SEAL

Otto R. Schoenrock, Oak Park, Ill.

Application February 28, 1952, Serial No. 273,796

4 Claims. (Cl. 308—187.1)

This invention relates to a seal and more particularly to an end face type seal encompassing a shaft or tube and disposed intermediate two axially spaced relatively movable members.

It is one of the objects of this invention to provide an improved seal which will exclude foreign matter from between the relatively movable members and prevent, as well, the escape of oil, grease, or other lubricants from between said members.

It is a further object of this invention to provide an improved seal which does not require grooving of the shaft or tube to effect a necessary leak-proof joint between the relatively movable members.

It is a further object of this invention to provide an improved seal which is adapted to automatically compensate for any axial, lateral, or tilting movement of said shaft or tube or relatively movable members.

It is a still further object of this invention to provide an improved seal which is simple in construction and may readily be assembled or disassembled from between the relatively movable members.

Further and additional objects will appear from the description, accompanying drawings, and appended claims.

In accordance with one embodiment of this invention, a seal is provided for use in combination with a non-rotatable shaft and a rotatable unit mounted thereon. The seal comprises a first shaft-encompassing element operatively connected to the rotating unit and movable therewith. Mounted on said shaft and spaced axially from the first element is a second shaft-encompassing relatively stationary element which is biased into abutting sealing relation with a portion of said first element. Encompassing the shaft and biased in an axially spaced relation with respect to the second element is a relatively stationary retaining piece which has a portion thereof extending transversely therefrom and projecting through the second and first elements and terminating on the opposite side of said first element. Mounted on and partially enclosing said second element and said retaining piece is a yieldable cover.

For a more complete understanding of this invention reference should be made to the drawing wherein:

Figure 1 is a vertical sectional view of the seal shown in combination with a crawler track roller;

Fig. 2 is a fragmentary sectional view taken along line 2—2 of Fig. 1;

Fig. 3 is a fragmentary sectional view taken along line 3—3 of Fig. 1;

Fig. 4 is a fragmentary sectional view taken along line 4—4 of Fig. 1, and

Fig. 5 is a fragmentary sectional view of a portion of the seal.

Referring now to the drawings and more particularly to Fig. 1, the seal is shown used in combination with a crawler track roller 10 the latter being rotatably mounted on a non-rotatable shaft 11. The shaft 11 is supported in a relatively fixed and non-rotatable position by a housing 12.

The crawler track roller 10 in this instance comprises a wheel rim 13 which has mounted on its inner peripheral surface in a pressed fit relation, the outer race 14 of a roller bearing 15. The outer race 14 is disposed in abutting relation with an annular radially extending flange 16 formed on the inner peripheral surface of the rim 13. The inner race 17 of the bearing 15 is a press fit about shaft 11 and is adapted to abut a shoulder 11' formed on the shaft.

The seal is disposed about the shaft and intermediate the roller bearing 15 and shaft housing 12 and comprises a first, or inner, annular sealing element or ring 18 which is operatively connected through a yieldable piece 20 to the inner peripheral surface of the rim flange 16 so that the ring 18 rotates therewith. Spaced axially, or in side by side, relation with respect to inner ring 18 is a second, or outer, sealing element or ring 21 which is biased by means of coil springs 23 into abutting sealing relation with respect to a face portion 28 of the ring 18. Spaced axially with respect to outer seal ring 21 and urged by coil springs 23 into spaced relation with respect to said seal ring is an annular retaining member 22. Mounted on and partially enclosing outer seal ring 21 and retaining member 22, is a yieldable cover 24 which serves to prevent foreign matter from working its way into the seal.

The yieldable sealing piece 20 is formed preferably of rubber and is held against the bearing race 14 and the inner peripheral surface of rim flange 16 by means of a plate 25 which is bolted directly to the outer face of rim 13. The plate 25 is provided with an offset collar 26 which embeds itself into the yieldable piece 20 and thereby frictionally holds the piece 20 in place. Sealing piece 20 is provided with a radially extending inner flange portion 27' which is adapted to be adhesively secured to a serrated portion of the outer peripheral surface of inner seal ring 18 as seen more clearly in Fig. 3. The serrations 27 on ring 18 are embedded into piece 20 and thereby effect unitary movement of said ring and piece.

Inner seal ring 18 is constructed preferably of metal and is provided with a center bore through which shaft 11 extends. The center bore is of such a size that considerable clearance is provided between the shaft and the ring. The aforementioned abutted face portion 28 of ring 18, which has a smooth hardened surface, is disposed about the outer peripheral portion of the ring and projects in an axial direction from the outer surface of the ring as seen in Fig. 1. A portion 30 of the inner surface of ring 18 adjacent the center bore is flared, as seen more clearly in Figs. 1 and 3. The purpose of the flared portion 30 will become apparent hereinafter.

The outer ring 21, is constructed preferably of metal and is provided with a face portion 32 corresponding to face portion 28 of ring 18. The two face portions 28 and 32 abut one another to form a leak-proof joint 33, thereby preventing any oil, grease or other lubricant from working its way out through this joint. The outer or non-abutting surface of ring 21 is provided with a plurality of symmetrically arranged pockets 34 each of which is adapted to accommodate one end of one of the coil springs 23. The outer ring 21 is provided with an oversize center bore for the shaft 11 thereby providing considerable clearance between the shaft and ring 21. The peripheral surface of the center bore of ring 21 is provided with a plurality of symmetrically arranged slots 31 as seen more clearly in Fig. 4. The function of these slots will become apparent hereinafter. The outer peripheral surface of ring 21 is provided with an annular groove 35 which is adapted to serve as a seat for one edge of cover piece 24 when the latter is secured in place. Because of the yieldable characteristic of the cover piece 24, any excessive pressure, which might develop within the cover piece, will effect compression of the portion of the piece, disposed between ring 21 and groove 35 and cause such portion to lift against the ring and thereby allow the pressure within the piece to be relieved without the seal being damaged.

The retaining member 22 is constructed preferably of metal and comprises a radially extending portion 29 and an axially extending apron 38 disposed adjacent to and encompassing said shaft. Portion 29 is provided with a plurality of hollow protuberances 36 which extend axially away from ring 21 as seen more clearly in Fig. 1. Each of the protuberances 36 loosely fits within a corresponding pocket 37 formed in the adjacent surface of the shaft housing 12. Each of the hollow protuberances is adapted to receive the outer end of one of the coil springs 23. Thus the springs 23 bias the piece 22 and ring 21 in axially spaced relation. Projecting in an axial direction from apron 38 are a plurality of elongated tongues or fingers 40 which, as seen in Fig. 1, extend between the shaft 11 and outer and inner rings 21 and 18, respectively. The end 41 of each tongue 40 is offset subsequent to the assembling of the seal so that the offset end 41 will engage the flared portion 30 of inner ring 18 and thereby prevent the retaining member 22 from becoming disengaged from inner and outer rings 21 and 18, respectively. The size and shape of the slots 31 formed in outer ring 21 are such that the tongues hold the ring 21, and piece 22 in non-rotatable relation, when the tongues extend therethrough. The length of each tongue 40 is sufficient to allow for slight axial adjustment of the shaft with respect to the housing or track roller 12. Furthermore sufficient clearance is provided between the inner peripheral surface of the apron 38 and tongues 40 of member 22 and the outer peripheral surface of shaft 11 so as to compensate for slight lateral or tilting movement of the shaft relative to the housing 12.

The yieldable cover 24 is constructed preferably of rubber and, as seen more clearly in Fig. 5, is provided with a radially extending flange portion 42 and an axially extending outer flange portion 44. The inner peripheral edge of flange 42 snugly encompasses shaft 11 as seen more clearly in Fig. 1. Flange portion 42 is provided with a plurality of apertures through which the protuberances 36 extend. The apertures are of such size that each protuberance is snugly engaged by the flange portion 42. Due to the biasing of springs 23, the flange portion 42 of cover 24 is sandwiched between the retaining member 22 and the housing 12 thereby effecting a proper seal between the member and housing. The frictional engagement between the cover 24 and housing 12 prevents relative turning of the former. The outer flange portion 44 of cover 24 has the outer edge thereof seated within the annular groove 35 formed in outer ring 21 by a holding strap or wire 45 which encompasses the grooved periphery of ring 21. The flange portion 44 is provided with a bulge 46 which compensates for any relative axial movement between retaining member 22 and outer ring 21.

The effectiveness of the oil tight seal between inner and outer rings 18 and 21, respectively, and the wedging of the cover 24 between retaining member 22 and housing 12 may be varied according to the requirements of the installation by varying the size and resilience of the coil springs 23.

Thus it will be seen that an end face seal has been provided which is constructed of relatively few simple parts and may be readily assembled or disassembled. Furthermore a seal has been provided which does not require any grooving of the shaft to effect the necessary leak-proof joint and which automatically compensates for any relative axial, lateral, or tilting movement of the shaft, the housing, and track roller.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. An oil seal bearing construction comprising a shaft, a bearing disposed about said shaft, a rotatable member engaging said bearing, a first seal ring member supported by said rotatable member and rotatable therewith, a second seal ring member abutting said first seal ring member, resilient means having one end limit thereof biasing said second seal ring member into abutting relationship with said first seal ring member, retaining means having hollow portions formed therein, a second end limit of said resilient means being housed in said retaining means hollow portions, an apertured housing disposed about said shaft, said retaining means hollow portions being insertable in said housing apertures, resilient cover means having one end limit frictionally secured between said retaining means and said housing, the opposed end limit of said cover means being detachably secured to the periphery of said second seal ring member, said latter cover means end limit being readily disengageable from said second seal ring member periphery from the exterior of said bearing construction when said latter construction is in the normal assembled position.

2. An oil seal bearing construction comprising a shaft, bearing means supported by said shaft and sealing means for hindering the flow of oil or foreign material with respect to said bearing means comprising two sealing rings coaxial with said bearing means and in endwise sealing engagement with each other, spring means having one end limit thereof acting on one of said sealing rings for forcing said sealing rings into sealing engagement with each other, retaining means acted upon by a second end limit of said spring means and maintained in spaced-apart relationship with said sealing rings, recessed housing means on said shaft, said retaining means projecting into said housing means recesses, annular resilient cover means encompassing the space between said retaining means and said sealing rings, one of said cover means end limits being secured in fluid sealing engagement between said housing and said retaining means, the other of said cover means end limits being readily detachably secured to said directly opposed sealing ring periphery whereby all of said spring means may be readily examined upon detachment of said cover means from said sealing ring periphery when said bearing construction is in the normal assembled position.

3. An oil seal bearing construction comprising a shaft, bearing means supported by said shaft, and sealing means for hindering the flow of oil or foreign material with respect to said bearing means comprising two sealing rings coaxial with said bearing means and in endwise sealing engagement with each other, spring means having one end limit thereof acting on one of said sealing rings for forcing said sealing rings into sealing engagement with each other, retaining means also acted upon by said spring means and disposed in spaced-apart relationship with said sealing rings, said retaining means having an annular radially extending portion having a plurality of hollow protuberances formed therein, one end limit of each of said spring means being housed in said protuberances, annular resilient cover means encompassing the space between said retaining means and said sealing rings, apertured fixed wall means limiting the axial movement of said retaining means from said seal rings, said retaining means protuberances being disposed in said fixed wall apertures, one of said cover means end limits being wedged between said wall means and said retaining means, exteriorly accessible annular binding means securing the oppositely disposed cover means end limit to the periphery of said sealing ring directly opposed thereto, whereby said cover may be readily detached from said seal ring periphery and said spring means exteriorly engaged when said bearing construction is in the normal assembled position.

4. An oil seal bearing construction comprising a shaft, bearing means supported by said shaft and sealing means for hindering the flow of oil or foreign material with respect to said bearing means comprising two sealing rings coaxial with said bearing means and in endwise sealing engagement with each other, spring means having one end limit thereof acting on one of said sealing rings for forcing said rings into sealing engagement with each other, retaining means having a radially extending portion acted upon by a second end limit of said spring means and maintained in spaced-apart relationship with said sealing rings, recessed housing means for said shaft, said retaining means projecting into said housing means recesses, said retaining means also having an axially extending portion concentric with said radially extending retaining means portion disposed about said shaft periphery in adjacent noncontacting relationship therewith, both of said sealing rings being disposed on said retaining means axially extending portion outer periphery between said retaining means radially extending portion and a distal end limit, said distal end limit of said retaining means axially extending portion being flared outwardly, said sealing ring disposed adjacent said retaining means flared portion being annularly recessed whereby both of said sealing rings are maintained on said retaining means axially extending portion, and annular resilient cover means encompassing the spacing between said retaining means radially extending portion and said sealing rings.

References Cited in the file of this patent

UNITED STATES PATENTS

| | | |
|---|---|---|
| 1,956,366 | Vedovell | Apr. 24, 1934 |
| 2,243,255 | McDonald | May 27, 1941 |
| 2,414,600 | Land et al. | Jan. 21, 1947 |
| 2,429,953 | Bottomley | Oct. 28, 1947 |
| 2,462,280 | Payne | Feb. 22, 1949 |
| 2,478,067 | Vedovell | Aug. 2, 1949 |
| 2,500,898 | Hastings | Mar. 14, 1950 |
| 2,701,154 | Dolhun | Feb. 1, 1955 |